US012794995B2

(12) United States Patent
Bray et al.

(10) Patent No.: US 12,794,995 B2
(45) Date of Patent: Nov. 10, 2026

(54) SYSTEMS AND METHODS FOR RULES-BASED ROUTING AMONG INTERCONNECTING DIRECTORIES

(71) Applicant: VOCALINK INTERNATIONAL LIMITED, London (GB)

(72) Inventors: David Andrew Bray, Hertfordshire (GB); Boy Anthony Kuhne, London (GB); Christopher Paul Kendall, Buckinghamshire (GB); Tung Hei Kwan, Berkshire (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 0 days.

(21) Appl. No.: 18/678,921

(22) Filed: May 30, 2024

(65) Prior Publication Data

US 2024/0406284 A1 Dec. 5, 2024

Related U.S. Application Data

(60) Provisional application No. 63/470,258, filed on Jun. 1, 2023.

(51) Int. Cl.

| | |
|---|---|
| ***H04L 67/563*** | (2022.01) |
| ***G06Q 20/40*** | (2012.01) |
| ***H04L 67/60*** | (2022.01) |
| *G06Q 20/10* | (2012.01) |

(52) U.S. Cl.

CPC ......... *H04L 67/563* (2022.05); *G06Q 20/405* (2013.01); *H04L 67/60* (2022.05); *G06Q 20/108* (2013.01)

(58) Field of Classification Search

None

See application file for complete search history.

(56) References Cited

U.S. PATENT DOCUMENTS

| | | | | |
|---|---|---|---|---|
| 7,809,840 | B2 * | 10/2010 | Jing | H04L 67/563<br>709/227 |
| 8,868,428 | B2 * | 10/2014 | Gruenstein | G10L 15/30<br>709/224 |
| 9,215,315 | B2 * | 12/2015 | Faaborg | H04M 7/0036 |
| 9,800,681 | B2 * | 10/2017 | Sarukkai | H04L 43/062 |
| 10,453,063 | B2 * | 10/2019 | Seshadri | G06Q 20/4014 |
| 10,460,299 | B1 * | 10/2019 | Nolte | G06Q 20/00 |

(Continued)

*Primary Examiner* — Jason D Cardone

(74) *Attorney, Agent, or Firm* — Harness, Dickey & Pierce, P.L.C.

(57) ABSTRACT

Systems and methods are provided for rules-based routing of a request based on a proxy included in the request. One example computer-implemented method includes receiving, by a first computing device, a proxy lookup request from a proxy requestor, the proxy lookup request including a proxy; based on the proxy and one or more rules indicative of a scheme associated with the proxy, submitting, by the first computing device, the proxy lookup request to a second computing device, in lieu of searching for the proxy in a local directory of the first computing device; receiving, by the first computing device, from the second computing device, a proxy lookup response, which includes account data linked to the proxy; and returning, by the first proxy service core computing device, the proxy lookup response, to the proxy requestor, in response to the proxy lookup request.

13 Claims, 4 Drawing Sheets

(56) References Cited

U.S. PATENT DOCUMENTS

| | | | |
|---|---|---|---|
| 2008/0027788 | A1 | 1/2008 | Lawrence et al. |
| 2015/0271267 | A1 | 9/2015 | Solis et al. |
| 2017/0118301 | A1* | 4/2017 | Kouru ..................... H04L 67/06 |
| 2018/0025179 | A1* | 1/2018 | Antonatos ........... G06F 16/2228 726/27 |
| 2018/0293276 | A1 | 10/2018 | Bae et al. |
| 2020/0311722 | A1 | 10/2020 | Ginger et al. |
| 2021/0182810 | A1* | 6/2021 | Johnston .............. G06Q 20/085 |
| 2021/0398078 | A1* | 12/2021 | Lyman .................. G06F 16/907 |
| 2022/0006788 | A1* | 1/2022 | Gunasingam ....... H04L 63/1491 |
| 2022/0019601 | A1 | 1/2022 | Michelis et al. |
| 2022/0067690 | A1* | 3/2022 | Nair ....................... G06Q 20/40 |
| 2022/0270095 | A1 | 8/2022 | Modi et al. |
| 2022/0294901 | A1* | 9/2022 | Tkaczyk ............. H04M 3/2281 |
| 2023/0075787 | A1 | 3/2023 | Davey et al. |
| 2023/0096070 | A1 | 3/2023 | Skiles et al. |
| 2023/0206207 | A1* | 6/2023 | Wu .................... G06Q 20/3276 705/75 |
| 2023/0275875 | A1* | 8/2023 | Samayavel ......... H04L 63/0281 726/12 |
| 2023/0410110 | A1* | 12/2023 | Maheshwari ...... G06Q 20/4015 |
| 2024/0086483 | A1* | 3/2024 | Welsford ............... G06Q 40/02 |
| 2024/0314540 | A1* | 9/2024 | Kuravangi-Thammaiah ............... H04W 8/20 |
| 2024/0338329 | A1* | 10/2024 | Adler ...................... G06F 30/32 |
| 2024/0403857 | A1* | 12/2024 | Bray ...................... G06Q 20/02 |
| 2024/0406284 | A1* | 12/2024 | Bray ....................... H04L 67/60 |
| 2024/0428208 | A1* | 12/2024 | Kuhne ................. G06Q 20/108 |
| 2024/0428220 | A1* | 12/2024 | Trevino Rojas ....... G06Q 20/02 |
| 2025/0262050 | A1* | 8/2025 | Govek .................. A61F 2/2433 |

* cited by examiner

SYSTEMS AND METHODS FOR RULES-BASED ROUTING AMONG INTERCONNECTING DIRECTORIES

CROSS-REFERENCE TO RELATED APPLICATION

This application claims the benefit of, and priority to, U.S. Provisional Application No. 63/470,258, filed Jun. 1, 2023. The entire disclosure of the above application is incorporated herein by reference.

FIELD

The present disclosure is generally directed to systems and methods for imposing rules-based routing of requests among interconnecting directories, for example, based on proxies or other reference data, etc. included in the requests.

BACKGROUND

This section provides background information related to the present disclosure which is not necessarily prior art.

Data structures are known for storing data, whereby the data may be retrieved in response to a request for the particular data. When a request for data is received, the different data structures are each queried to determine which data structure includes the data identified in the request. The data may be included in a local data structure, or one or more remote data structures, whereby each is searched one after the other, sequentially or according to some order. When the data structure is identified, the data is retrieved and returned in response to the request.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Data structures may include directories of specific data, such as, for example, identifying data and proxies specific to the identifying data. The data structures, in turn, may be separate in the context of geographic location, ownership and/or control, such that access to particular data involves a particular data structure. It is problematic, in various implementations, though, to identify the specific data structure, for a given request, especially when the data structure must be identified from numerous different data structures associated with different parties and/or located in different jurisdictions. In connection with a request, therefore, a local directory may be checked, followed by a sequence of directories to identify the data structure in which the requested data is stored. The sequence, generally, ignores insights in the request which may inform the specific data structure, or limit the data structure(s) in which the requested data may be stored.

Uniquely, the systems and methods herein provide for imposing rules-based routing, which is based on a proxy included in a lookup request and/or a currency type/code included in the lookup request (broadly, based on reference data included in the lookup request, etc.), to route the request among interconnected directories. In particular, in one example embodiment, the proxy is exposed to one or more rules indicative of insight(s) into the proxy. By leveraging insight(s) based on the proxies, the sequence of interactions with proxy directories is limited, which provides for overall efficiencies in the data access and continuation of real time (or near real time) functionalities. That said, it should be appreciated that in other example embodiments, such insights may also be used be used in connection with account verification, confirmation of payees, sanction checking against names, etc.

Figure 1:
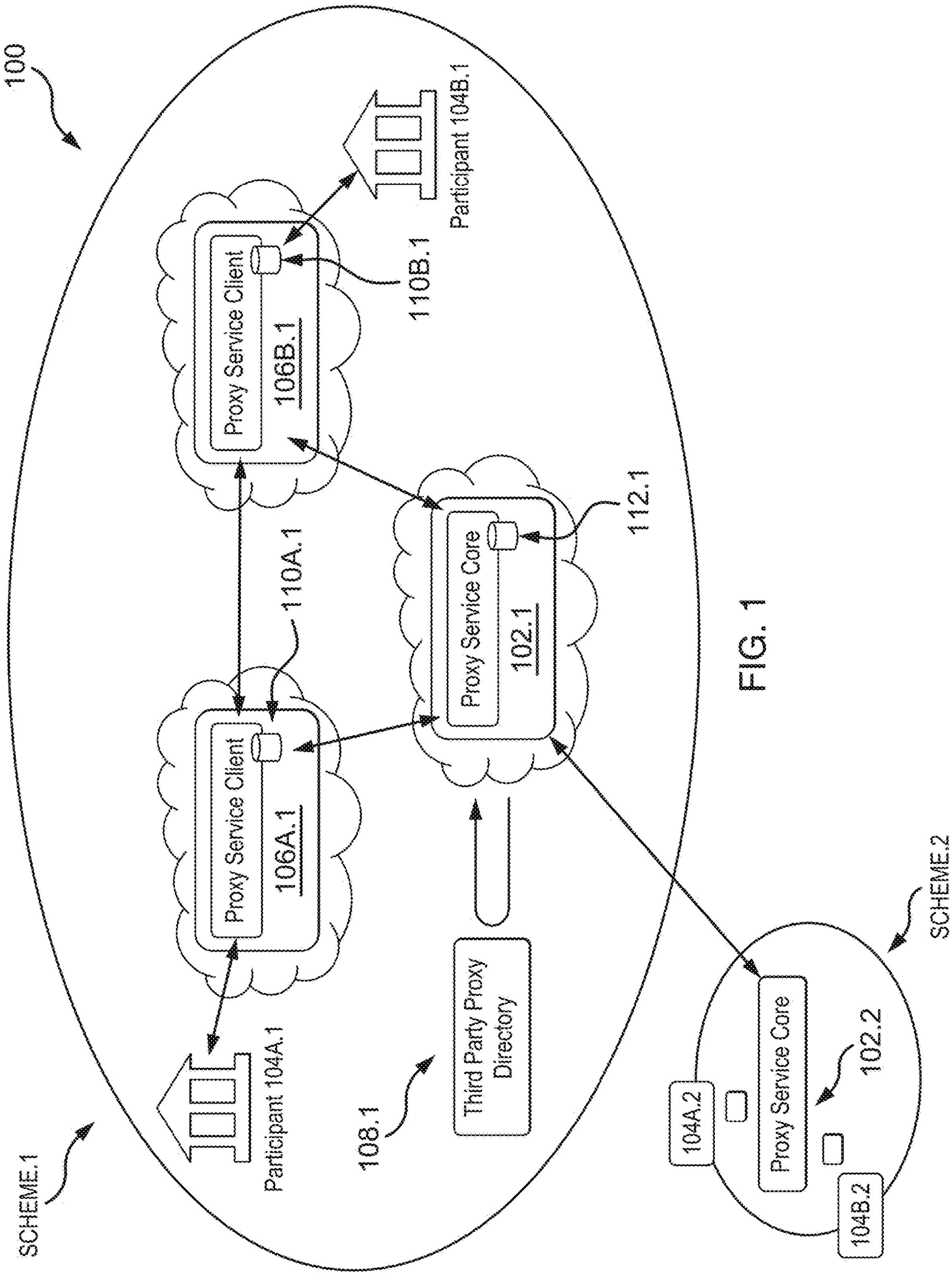
FIG. 1 illustrates an example system of the present disclosure suitable for use in imposing rules-based routing of requests among interconnected directories, based on proxies included in the requests.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, distribution of directories in or between different regions, relations among participants, privacy concerns and/or requirements, etc.

The illustrated system 100 generally includes multiple schemes (e.g., SCHEME.1, SCHEME.2, etc.) each including a proxy service core 102 (e.g., 102.1, 102.2, etc.), multiple participants 104A-104B (e.g., 104A.1, 104A.2, 104B.1, 104B.2, etc.), multiple proxy service clients 106A-106B (e.g., 106A.1, 106B.1, etc.), and a third party (or 3rd party) proxy directory 108.1, each of which is coupled to one or more networks. The network(s) (as indicated by the arrowed lines in FIG. 1) may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof, etc.

While the example of FIG. 1 is provided for (or in the context of) proxies, it should be appreciated that any suitable account data or account related data or, more generally, reference data, may be used instead of proxies, whereby the proxy service cores and the proxy service clients may broadly be considered service cores and service clients, i.e., not specific to proxies. And, whether based on proxies or other reference data, the service cores and the service clients may cooperate with one another and/or with third party directories (as generally described herein) to provide for resolution of payment data (or other data), account verification, confirmation of payees, sanction checking against names, and/or other services associated with or related to payments. That said, it should be understood that the term proxy as used herein may be inclusive of any reference data, which is linked to any other data and which is not specifically linked to phone numbers, email addresses, etc. (e.g., a proxy may include any reference data by which other data may be accessed, etc.).

In this example embodiment, for each scheme, the participant 104A (e.g., participant 104A.1, etc.), for example, includes a banking institution, or bank or other financial institution, which is associated with various users (or customers) (not shown). In particular, the participant 104A is configured to issue accounts to users, and the accounts are each associated with a unique account identifier (e.g., account number (alone or in combination with a routing number), primary account number (PAN), virtual account number, wallet identification number, etc.), alone or in combination with expiration dates, verification codes, etc., (broadly, account data). Account data should be understood to be any identifying data associated with an account, from which the account may be identified, based on the account data, alone or in combination with other data. The accounts may be credit accounts, debit accounts, prepaid accounts, checking accounts, or other types of financial/currency accounts, which are issued by the participant 104A, for example, to fund a transaction (e.g., purchase, money transfer, etc.) by the various users.

In connection therewith, the participant 104A is configured to link the account data to a proxy. A proxy may include, for example, data known to the user, and unique to the user. In this example, the proxy includes a phone number, or more specifically, a mobile phone number, but may include, in other examples, an email address, government-issued number/identifier, account verification information, or other numeric, alpha or alpha-numeric string, etc. In another example, the proxy may include an international bank account number or IBAN. The proxy is stored in database 110A (e.g., database 110A.1, etc.) associated with the proxy service client 106A (e.g., proxy service client 106A.1, etc.), as explained more below.

It should be further appreciated that certain ones of the proxy types may include data indicative of one or more schemes/regions. For example, a phone number includes a country code (e.g., +44 for United Kingdom, +46 for Sweden, or +1 for United States, etc.), etc., which may be indicative of a native country of the phone number. Similarly, the IBAN includes a country code or country prefix (e.g., FR ## #### #### ####, where FR is a France country code, etc.), which is indicative of a native country of the account (e.g., country of issuance, etc.). In addition, email addresses include a domain extension, which may indicate a region (e.g., www.###.de as a Germany top-level domain, etc.). Likewise, the government-issued number may include forms or formats that are indicative of the region and/or country of issuance, etc.

As shown in FIG. 1, the participant 104A is configured, by the proxy service client 106A, to store the proxy in a proxy directory, for example, in the database 110A.

That is, the participant 104A is configured, by the proxy service client 106A, to register one or more proxies for different account/users. In this way, the participant 104A is configured to associate or link the proxy in the proxy directory to account data for the user, whereby a registry data structure is stored in the database 110A indicating the specific proxy reference address of the proxy in the directory. In order to extend the usability of the proxy (e.g., to other participants, etc.), the participant 104A is further configured, by the proxy service client 106A, to submit the proxy to the proxy service core 102 (e.g., proxy service core 102.1, etc.) for registration. The proxy service core 102, in turn, is configured to store the proxy in a database 112 (e.g., database 112.1, etc.), in association with the participant 104A (e.g., a proxy reference address/identifier associated with the participant 104A, etc.), in a local registry in the database 112.

Notably, however, the account data is not submitted by the participant 104A to the proxy service core 102 as part of the registration in this embodiment, whereby the proxy service core 102 is configured to query the participant 104A, to determine the account data that is linked to the proxy, in response to a request including the proxy (e.g., as submitted by a proxy requestor, etc.). In this manner, the participant 104A, by the proxy service client 106A, is configured to manage the proxy directory included in the database 110A (e.g., as a federated service, etc.). That said, in other embodiments, the participant 104A may be configured, by the proxy service client 106A, to submit the proxy and account data to the proxy service core 102, whereby the proxy service core 102 is configured to store the proxy and account data in the database 112, and whereby the proxy service core 102 is permitted to solve the proxy with limited, or no, interaction with the participant 104A.

It should be appreciated that in this example embodiment, the participant 104B is configured similar to participant 104A, as it pertains to the proxies. As such, the participant 104B includes databases 110B, (e.g., 110B.1 associated with the proxy service client 106B.1, etc.), which includes a proxy directory of proxies registered with the proxy service core 102 and linked to account data of the respective participant 104B.

It should be further noted that each of the proxy service client 106A and the proxy service client 106B includes a rules data structure (and/or related rules engine). The rules data structures are configured to store one or more rules related to identifying a proxy to a specific scheme, in which the proxy is to be resolved (e.g., a native scheme of the proxy, etc.). The rules are described in more detail below. That said, in some example embodiments, the rules data structures (and/or related rules engines) may be included in the respective databases 110A, 110B, etc. Further, in some example embodiments, similar rules data structures (and/or related rules engines) may be included in the proxy service core 102.

The participants 104A-104B are included in FIG. 1 for purposes of illustration, and it should be understood that other system embodiments generally includes tens, hundreds, or thousands, or more or less participants.

The proxy service core 102 is further configured to communicate with the third party proxy directory 108 (e.g., 108A.1, etc.). The third party proxy directory 108 includes a proxy directory for accounts, which, like above, includes proxies linked to account data. That said, in some examples, the third party proxy directory 108 may include, for instance, any directory (e.g., a single unfederated directory, etc.), which is connected (or otherwise in communication with) the proxy service core 102, but that is not controlled in whole or in part by the proxy service core 102 (e.g., it may not be indexed and/or does not include routing rules, etc.). To this point, the third party proxy directory 108 may include a legacy directory from a payment network (e.g., that is managed on behalf of a scheme in the same or a different country, etc.) or a directory managed for a third party organization (e.g., such as a scheme or mobile payments provider such as YAPE, PLIN, Zeller, etc.; etc.). In other examples, the third party proxy directory 108 may include a federated directory, for instance, where the directory 108 implements one or more client services as identified, described, or eluded to herein.

In addition in FIG. 1, as indicated above, the system 100 includes two separate schemes, which are illustrated, each with a respective proxy service core 102. The proxy service core 102.1 and the participants 104A.1-104B.1 are bound together by a circle, which is representative of a first scheme, or SCHEME.1. The system 100 also includes a second scheme, or SCHEME.2, which is similar, as it pertains to the components therein, to SCHEME.1. In connection therewith, for purposes of illustration, each of the components of SCHEME.1 should be understood to be functionally and/or generally the same in SCHEME.2 (yet different, in that, for example, the participant 104A.1 is different than participant 104A.2), but potentially, with different numbers of the respective components.

That said, it should be appreciated that descriptions of the proxy service core 102, for example, are generic to proxy service core 102.1 and 102.2, while description of proxy service core 102.1 or proxy service core 102.2 will often be specific to that proxy service core of the corresponding scheme. The same applies to the descriptions of the participants 104A-104B, etc.

Each scheme may be specific to a proxy service core and may be defined, for example, by a particular geographic boundary or governmental or geopolitical boundary (e.g., country, state, territory, city, postal code), or limited to a particular type of participant(s) or service (e.g., for which a proxy is requested, etc.), or directed to a particular currency type, etc. It should also be appreciated that the proxy service cores 102.1 and 102.2 are configured to communicate with one another, as indicated by the arrowed line in FIG. 1. In general, the system 100 may provide a wide ranging solution for proxy lookups, where the schemes (e.g., SCHEME.1, SCHEME.2, etc.) are each specific to a scheme such as, for example, a country or portion of a country, a currency type, etc. In this manner, each region and/or one or more countries may be associated with a scheme, whereby each of the schemes operates consistent with the description herein. For example, where SCHEME.1 is the United States and SCHEME.2 is the United Kingdom, and as should be apparent from FIG. 1, the schemes are coupled in communication to provide proxy lookup across the different countries.

It should be appreciated that the schemes may be defined otherwise in other embodiments. For example, the schemes may instead be service-based, rather than geography-based. More generally, the different schemes may be delineated by restrictions, regulations, services accessibility, etc.

In this example embodiment, in connection with a real-time payment transaction, the proxy service core 102 is configured to resolve proxies through messaging within the system 100, for example, to/from particular participants 104A-104B and/or other parts of the system 100, etc.

In particular, a first user (e.g., sender, etc.) (not shown) requests a real-time transaction, in which funds are to be exchanged with a second user (e.g., recipient, etc.) (not shown). The request includes a proxy for an account of the recipient, or recipient account, which in this example, includes a phone number. The phone number, in turn, includes a country code prefix or +44 (United Kingdom) in this example. As noted above, other proxies may include emails address, IBANs (or other account numbers), government-issued identifiers (e.g., social security number, Aadhaar number, driver's license number, identify number, etc.).

In order to initiate the real-time transaction, the proxy is resolved into a payment account number, or token specific to the account from which funds are to be transferred. To do so, the participant 104A is configured, by the proxy service client 106A, to receive a proxy lookup request for the proxy of the recipient account. The proxy lookup request may be in the form of an application programming interface (API) call, or otherwise. In one example, the request may be consistent with one or more forms/formats, or based on specific instructions as to the form/format of the proxy lookup request. It should be appreciated, however, that the request may include a variety of information and also, specifically, the proxy. For instance, the request may also include a currency type for the given transaction (e.g., the sender may specify the particular currency in which they want to transact, etc.), which may be used to perform value based routing of the request/transaction, etc.

Upon receipt of the request, in this example embodiment, the participant 104A is configured, by the proxy service client 106A, to apply one or more rules to the proxy included in the proxy lookup.

In particular, the participant 104A is configured, by the proxy service client 106A, to determine the type of proxy (e.g., phone number, IBAN, email address, etc.) and to apply rules specific to the type of proxy to the proxy (e.g., from the rules data structure in the proxy service client 106A, etc.). The rules may merely attempt to determine, in this example, if the proxy is local to SCHEME.1, i.e., the scheme in which the proxy lookup request is received. An example rule may include "if country code=+44, local, else non-local." Another example rule may define the proxy as non-local and further specify the scheme of the proxy, such as, for example, "if country code=+46, non-local and scheme=Sweden." Similar rules may be provided for IBANs, which also include country codes. Other rules may be defined for still other proxies, such as, for example, emails, government-issued identifiers, etc. It should be understood that the rules may not specifically identify one scheme, but may instead rule out one or more schemes, etc. Further, in some examples, particular rules may be applied based on a currency type indicated in the proxy lookup request (e.g., to facilitate or provide certain value-based services for the transaction, etc.).

When the proxy is local, the participant 104A is configured, by the proxy service client 106A, to proceed to a lookup in the proxy directory of the database 110A. Conversely, when the proxy is not local, the participant 104A is configured, by the proxy service client 106A, to bypass the local search and to submit the proxy lookup request to the proxy service core 102.

In a variation of the above embodiment, the participant 104A may be configured, by the proxy service client 106A (and in particular, a rules-component (e.g., rules data structure, etc.) thereof) to impose a tag on the proxy lookup request and to handle the proxy lookup request accordingly. The one or more rules may indicate a tag and instruction related to a scheme to be searched. For example, Table 1 illustrates one or more example rules that may be applied to the proxy lookup request. Based on Table 1, in this example, the participant 104A is configured, by the proxy service client 106A, to determine the type of proxy and to append a tag to the proxy lookup request, as an instruction to conduct, or not, the local search.

TABLE 1

| Rule | Tag |
|---|---|
| Proxy = phone number AND country code = local | Search_LocalDirectory_Only |
| Proxy = phone number AND country code ≠ not local | Skip_LocalDirectory_Search |

TABLE 1-continued

| Rule | Tag |
|---|---|
| Proxy = IBAN AND country code = local | Search_LocalDirectory_Only |
| Proxy = IBAN AND country code ≠ not local | Skip_LocalDirectory_Search |
| Proxy ≠ phone number or IBAN | Null |
| Proxy = phone number AND currency code = local | Search_LocalDirectory_Only |
| Proxy = phone number AND currency code ≠ not local | Skip_LocalDirectory_Search |

In this embodiment, the participant 104A may be configured, by the proxy service client 106A (and in particular, a routing-component thereof) to either search in the local proxy directory of the database 110A, or to bypass or skip the local search and to submit the proxy lookup request to the proxy service core 102.

In Table 1, the null tag is provided when no rules apply to the proxy, or the proxy is unrecognized, whereby the participant 104A may be configured, by the proxy service client 106A, to proceed with a local search, prior to submitting the proxy lookup request to the proxy service core 102, if unsuccessful.

The tags described herein may be useful when rules and routing/searching are provided in more than one program, application or service, as part of the proxy service client 106A. Additionally, or alternatively, the tags may further be useful in connection with specific communication forms/formats, whereby the communication may involve one or more REST API connections and/or communication gateways to accommodate/instruct the specific communication forms/formats. That said, it should be appreciated that the tags may be omitted in various embodiments, as in the example described above.

Regardless, upon receipt of the proxy lookup request, the proxy service core 102 is configured to apply one or more rules to the proxy included in the proxy lookup request (e.g., based on a rules data structure (and/or related rules engine) included in the proxy service core 102, etc.). The rules, in general, permit the proxy service core 102 to identify the scheme, which may resolve the proxy and/or to identify one or more schemes, which may not resolve the proxy. Like above, in this example, the proxy service core 102.1 is configured to assess the proxy based on a rule(s) specific to the proxy. The rules may, again, merely attempt to determine, in this example, if the proxy is local to SCHEME.1, i.e., the scheme in which the proxy lookup request is received. An example rule may include "if country code=+44, local, else non-local." Another example rule may define the proxy as non-local and further specify the scheme of the proxy, such as, for example, "if country code=+46, non-local and scheme=Sweden." Similar rules may be provided for IBANs, which also include country codes. Other rules may be defined for still other proxies, such as, for example, emails, government-issued identifiers, currency types, etc. It should be understood that the rules may not specifically identify one scheme, but may instead rule out one or more schemes, etc.

When the proxy is local, for example, to SCHEME.1, the proxy service core 102.1 is configured to proceed to a lookup in the proxy directory of the database 112A. If not found in the local directory of the database 112A, the proxy service core 102.1 may be configured to search in the local proxy directories of the participants and/or the third party proxy directory 108.1 (e.g., broadcast the proxy lookup request, etc.). If not found in either, then, the proxy service core 102.1 is configured to return an empty result to the participant 104A.1, for example, in response to the proxy lookup request (e.g., with a not found error, etc.) (that is, not proceed to the other schemes, i.e., because the proxy is known to be local).

When the proxy has an indeterminate locality, the proxy service core 102.1 may be configured to search locally (e.g., the search in the database 112A and any one or more third party directors in SCHEME.1 (e.g., directory 108.1, etc.), etc.)

Conversely to the above, when the proxy is not local or, potentially, when the proxy has an indeterminate locality, the proxy service core 102.1 is configured to bypass the local search (e.g., the search in the database 112A and any third party directors in SCHEME.1 (e.g., directory 108.1, etc.), etc.) and to submit the proxy lookup request to the proxy service core 102.2 (e.g., a cross-border routing, etc.), as determined based on the proxy and/or as determined based on one or more rules.

Upon receipt of the request, the proxy service core 102.2 is configured to search a local directory (e.g., in the database 112.2, in a third party proxy directory, etc.), and to cither resolve the proxy therefrom or submit the request to the participants and/or third parties associated with the specific proxy in SCHEME.2 (e.g., broadcast the proxy lookup request, etc.). The proxy service core 102.2 is configured to provide a proxy lookup response with the resolved proxy, to the proxy service core 102.1. The proxy service core 102.1, in turn, is configured to return the product lookup response to the participant 104A.1, thereby permitting the transfer to be initiated and/or completed.

It should be understood that the one or more rules employed by the participant 104A may be different than the one or more rules employed by the proxy service core 102. What's more, the one or more rules may be defined to identify country codes, currency codes, forms, formats, conventions, etc., which are embodied in the proxies and/or indicative of the particular scheme or region. As suggested above, the rules may not necessarily identify a specific local directory, scheme, or region, but may merely limit or reduce the number of potential local directories, schemes, or regions, for resolving the proxies.

It should be further appreciated again that, although the descriptions and examples provided herein relate to the resolution of proxies to account data, the parallel processing of requests and aggregation of responses may similarly apply to (or be used in connection with) any other action or functionality relating to the proxy and/or relating to RTP transactions herein. For instance, the lookup and/or broadcasting features of the present disclosure may additionally have applicability relating to, without limitation, requesting sanctions checks on parties associated with the transactions from multiple connected entities, requesting foreign exchange rates and fees from multiple providers to facilitate cross-border payments, requesting verification of one or more aspects of the transactions from multiple connected entities, requesting one or more identification attributes relating to the transactions from multiple connected entities, etc.

Figure 2:
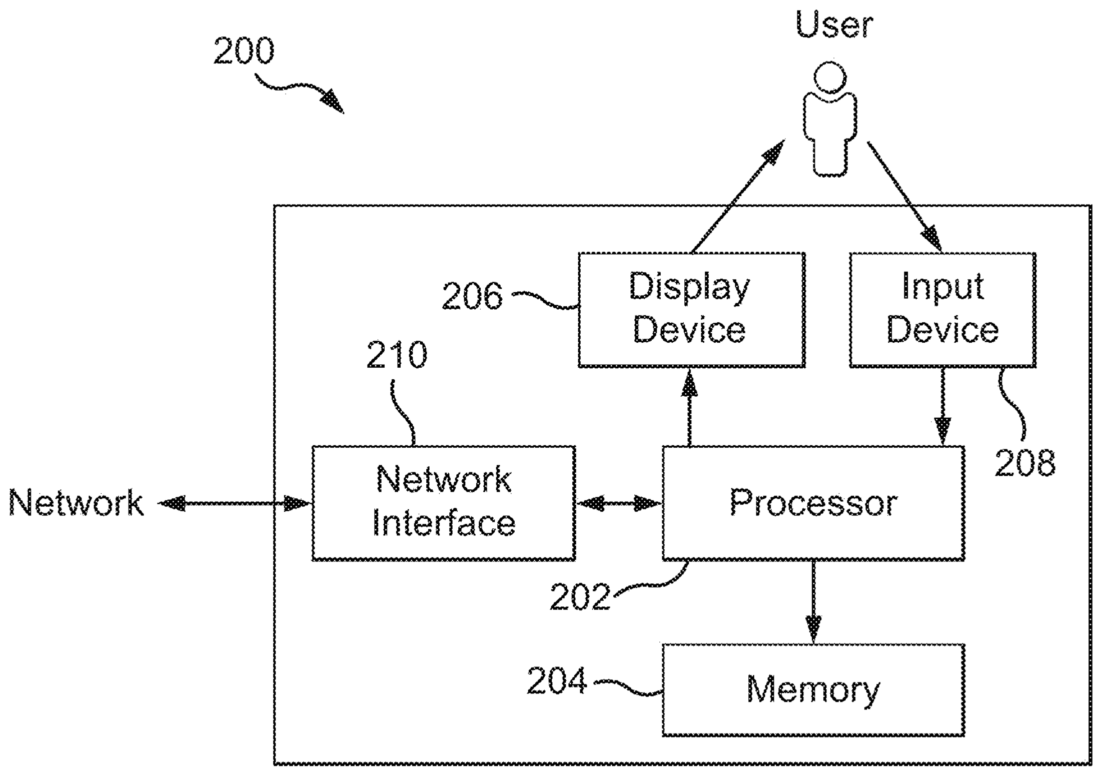
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, in each of the schemes, each of the proxy service core 102, the participants 104A-104B, the proxy service clients 106A-106B, the third party proxy directory 108, and the databases 110, 112, etc., may be considered, may include, and/or may be implemented in a computing device consistent with the computing device 200, coupled to (and in communication with) the one or more networks of the system 100. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, routing logic, proxies, account data, proxy directories, message formats/formatting, sequence stacks, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 and an input device 208.

The presentation unit 206 is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., account data, proxies, etc.), etc. And, various interfaces may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The input device 208 receives inputs from the user (i.e., user inputs) of the computing device 200 such as, for example, inputs to register/define a proxy for an account, etc. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein and/or with other devices described herein. In some example embodiments, the computing device 200 may include the processor 202 and one or more network interfaces incorporated into or with the processor 202.

Figure 3A:
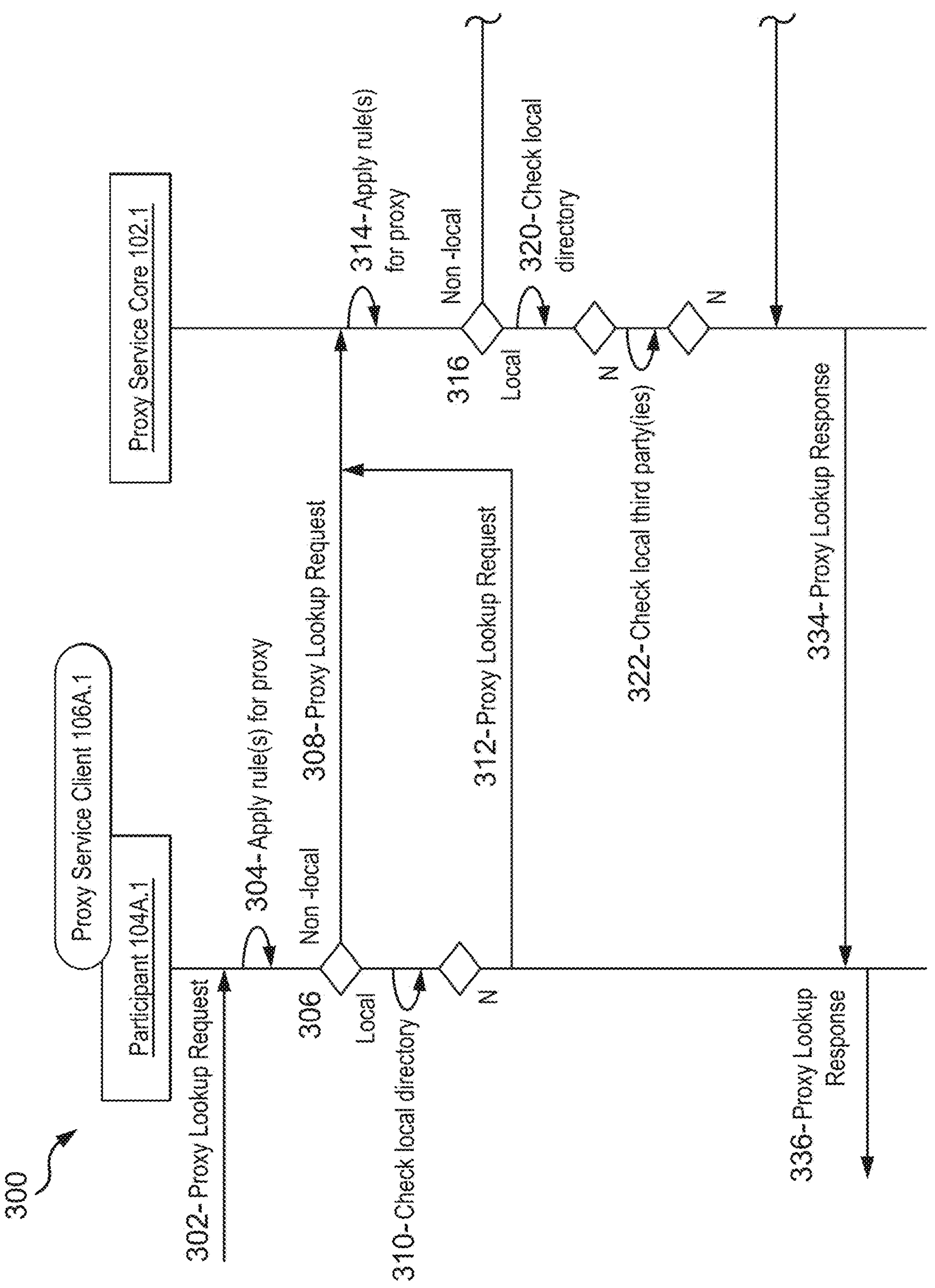
FIG. 3A and FIG. 3B illustrate an example method, which may be implemented in connection with the system of FIG. 1, for use in rules-based routing of a request, based on a proxy included in the request.
Figure 3B:
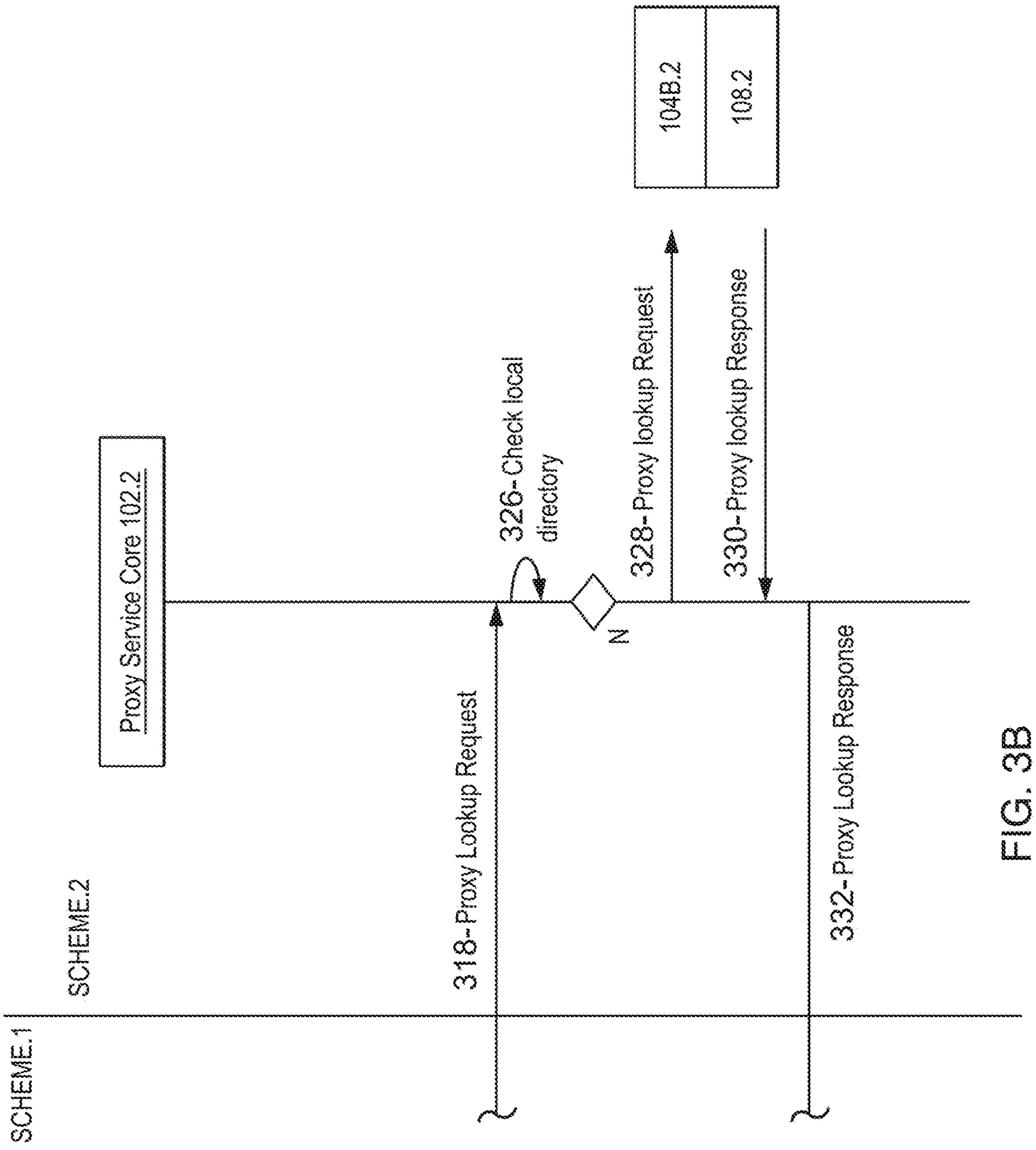

FIG. 3A and FIG. 3B illustrate an example method 300 for use in routing proxy lookup requests based on rules, which are indicated based on the content of the proxy included therein. The example method 300 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 300.

At the outset, in method 300, interactions are presented between the participant 104A.1 in SCHEME.1 and the participant 104B.2 in SCHEME. 2 (as also illustrated in FIG. 1). It should be appreciated that the method 300 may be applicable and/or associated with other pairs of participants in different schemes, without limitation. In addition, it should be appreciated that each of the participants 104 and the proxy service cores 102 in the schemes has rules stored therein, which provide insight(s) into a scheme in which a proxy may be resolved. The rules may be specific to phone numbers, IBANs, email addresses, currency types, etc.

Initially, the proxy requestor submits, at 302, a proxy lookup request to the participant 104A.1, for example, from a user associated with a sender account. The proxy lookup request includes the proxy, which is expected and/or known to be linked to an account by one or more other participants. In this example, the proxy includes an IBAN, which is UK ## #### #### ####, where the UK is a country code for the United Kingdom. It should be recalled that, consistent with the description above, SCHEME.1 in the example of FIG. 1 is the region defined as the United States, and SCHEME.2 in the example of FIG. 1 is the region defined as the United Kingdom.

With reference to FIG. 3A, again, in response to the proxy lookup request, the participant 104A.1, as configured by the proxy service client 106A.1, retrieves and applies, at 304, one or more rules for the proxy. The rules may be defined to either determine whether the proxy is local, or non-local, or the rules may be defined to identify a scheme of resolution for the proxy (i.e., a scheme in which the proxy may be resolved). In this example, the one or more rules determine, at 306, if the proxy is local or non-local. That is, the participant 104A.1, as configured by the proxy service client 106A.1, identifies the type of proxy included in the proxy lookup request and then applies the rules specific to the type of proxy. Here, the proxy is identified as an IBAN, whereby rules specific to IBAN are applied (e.g., "if IBAN and if country code=US, local, else non-local.").

Optionally, in connection with the determination, the participant 104A.1, as configured by the proxy service client 106A.1, may tag the request with a specific search instruction (e.g., local only, skip local, etc.), whereby the participant 104A.1, as configured by the proxy service client 106A.1, also abides by the instruction.

That said, in this example, the proxy is UK ##### #####. As such, because the SCHEME.1 is specific to the United States, the participant 104A.1, as configured by the proxy service client 106A.1, determines that the proxy is non-local, and consequently, at 308, submits the proxy lookup request to the proxy service core 102.1 (e.g., in lieu of searching for the proxy in a directory of the proxy service client 106A.1, etc.). Conversely, had the proxy been local, as shown in FIG. 3A, the participant 104A.1, as configured by the proxy service client 106A.1, checks, at 310, the local proxy directory in the database 110A.1, for example, to determine if the proxy is present. If so, the participant 104A.1, as configured by the proxy service client 106A.1, resolves the proxy. If not, as indicated in FIG. 3A, the participant 104A.1, as configured by the proxy service client 106A.1, submits, at 312, the proxy lookup request to the proxy service core 102.1.

In response to the proxy lookup request, the proxy service core 102.1 retrieves and applies, at 314, the rules for the proxy (e.g., from the rules data structure therein, etc.). Consistent with the above, the one or more rules may be defined to either determine whether the proxy is local, or non-local, or the rules may be defined to identify a scheme of resolution for the proxy (i.e., a scheme in which the proxy may be resolved). In this example, the one or more rules determine, at 316, the specific scheme in which the proxy is to be resolved. In this manner, the one or more rules provides a lookup for the specific country code. That is, the proxy service core 102.1 identifies the type of proxy included in the proxy lookup request and then applies the rules specific to the type of proxy. Here, the proxy is identified as an IBAN, whereby rules specific to IBAN are applied (e.g., "if IBAN and if country code=US, scheme=United States, else check next rule;" and "if IBAN and if country code=UK, scheme=United Kingdom, else check next rule;" and "if IBAN and if country code=FR, scheme=France, else check next rule;" etc.).

In this example, because the proxy is UK ## #### #### #### and because the SCHEME.1 is specific to the United States, the proxy service core 102.1 determines that the proxy should be resolved in the SCHEME.2, which is specific to the United Kingdom. Consequently, at 318, the proxy service core 102.1 submits the proxy lookup request to the proxy service core 102.2 in the SCHEME.2 (e.g., in lieu of searching for the proxy in a directory of the proxy service core 102.1, etc.).

Conversely, had the proxy been local, as shown in FIG. 3A, the proxy service core 102.1 checks, at 320, the local proxy directory in the database 112.1 to determined if the proxy is present. If so, the proxy service core 102.1 resolves the proxy. If not, as indicated in FIG. 3A, the proxy service core 102.1 checks, at 322, the local proxy directory of one or more third parties proxy directory 108.1 to determine if the proxy is present. If so, the proxy service core 102.1 cooperates with the third party proxy directory 108.1 to resolves the proxy. If not, as shown, the proxy service core 102.1 submits, at 334, a response to the proxy lookup request back to the proxy service client 106A.1 of the participant 104A.1, for example, with an error message (e.g., a proxy not found error, etc.). The participant 104A.1, as configured by the proxy service client 106A.1 submits the proxy lookup response, at 336, to the proxy requestor. Thereafter, the proxy requestor may terminate the transaction or proceed in a different manner.

With continued reference to FIG. 3B, the proxy service core 102.2 checks the local directory of the database 112.2, at 326, to determine if the proxy is present. If not, the proxy service core 102.2 then submits the proxy lookup request, at 328, to the participant 104B.2 and/or third party proxy directory 108.2 to resolve the proxy. When resolved, the participant 104B.2 and/or third party proxy directory 108.2 provides, at 330, the proxy lookup response, which includes the resolved proxy, back to the proxy service core 102.1.

Next, the proxy service core 102.2 submits, at 332, the proxy lookup response to the proxy service core 102.1. The proxy service core 102.1, in turn, submits, at 334, the proxy lookup response to the proxy service client 106A.1 of the participant 104A.1. The participant 104A.1, as configured by the proxy service client 106A.1 submits the proxy lookup response, at 336, to the proxy requestor. Thereafter, the proxy requestor may initiate the real time transaction to the account associated with the account data returned via the proxy lookup request.

It should also be appreciated that encryption may be employed, optionally, in the method 300. As shown in FIG. 3B, for instance, the encryption may be initiated prior to the proxy service client (associated with the participant 104B.2) submitting the proxy lookup response to the proxy service core 102.2, at 330. Again, only the account data may be encrypted in this example, or the account data and other data may be encrypted in other examples. Consequently, as also illustrated in FIG. 3A, the participant 104A.1, as configured by the proxy service client 106A.1, decrypts the account data, prior to submitting the same to the requestor, at 336. The encryption key, in this example, which generally includes a public key associated with the proxy service client 106A.1 and/or the participant 104A.1, may be passed along with the proxy lookup request by the proxy service client 106A.1, or by either of the proxy service cores 102.1, 102.2.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, by a first computing device, a proxy lookup request from a proxy requestor, the proxy lookup request including a proxy; (b) based on the proxy and one or more rules indicative of a scheme associated with the proxy, submitting, by the first computing device, the proxy lookup request to a second computing device, in lieu of searching for the proxy in a local directory of the first computing device; (c) receiving, by the first computing device, from the second computing device, a proxy lookup response, which includes account data linked to the proxy; and/or (d) returning, by the first computing device, the proxy lookup response, to the proxy requestor, in response to the proxy lookup request.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, by a first computing device, a lookup request from a requestor, the lookup request including reference data; (b) based on the reference data and one or more rules indicative of a scheme associated with the reference data, submitting, by the first computing device, the lookup request to a second computing device, in lieu of searching for the reference data in a local directory of the first computing device; (c) receiving, by the first computing device, from the second computing device, a proxy lookup response, which includes account data linked to the proxy; and/or (d) returning, by the first computing device, the lookup response, to the requestor, in response to the lookup request.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being “on,” “engaged to,” “connected to,” “coupled to,” “associated with,” “included with,” or “in communication with” another feature, it may be directly on, engaged, connected, coupled, associated, included, or in communication to or with the other feature, or intervening features may be present. As used herein, the term “and/or” and the phrase “at least one of” includes any and all combinations of one or more of the associated listed items.

Although the terms first, second, third, etc. may be used herein to describe various features, these features should not be limited by these terms. These terms may be only used to distinguish one feature from another. Terms such as “first,” “second,” and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase “means for,” or in the case of a method claim using the phrases “operation for” or “step for.”

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in rules-based routing of a request, based on a proxy included in the request, the method comprising:

receiving, by a first computing device, a lookup request to lookup account data associated with a proxy from a requestor, the lookup request including the proxy, the proxy including a phone number;

determining a type of the proxy;

based on the type of the proxy, the proxy, and the one or more rules indicative of a scheme associated with the type of the proxy, determine that the proxy is non-local to a first local directory of the first computing device;

based on the determination that the proxy is non-local to the first local directory, and based on the one or more rules, submitting, by the first computing device, the lookup request to a second computing device, in lieu of searching for the proxy in a local directory of the first computing device, which includes a plurality of local proxies;

receiving, by the first computing device, from the second computing device, a lookup response, which includes account data linked to the proxy; and returning, by the first computing device, the lookup response, to the requestor, in response to the lookup request.

2. The computer-implemented method of claim 1, further comprising:

applying the one or more rules, which are consistent with the type of the proxy, to identify the scheme associated with the type of the proxy.

3. The computer-implemented method of claim 2, wherein applying the one or more rules includes applying one of the one or more rules, which defines the proxy as local or non-local; or wherein applying the one or more rules includes applying one of the one or more rules, which defines the scheme associated with the proxy; or wherein applying the one or more rules includes applying one of the one or more rules, which excludes schemes known not to be associated with the proxy.

4. The computer-implemented method of claim 1, wherein the first computing device is a participant computing device and the second computing device is a proxy service core computing device.

5. The computer-implemented method of claim 1, wherein the first computing device is a first proxy service core computing device and the second computing device is a second proxy service core computing device located in a region associated with the scheme.

6. The computer-implemented method of claim 1, wherein the scheme is defined by a region; and wherein the scheme is geographically based and defined as a country.

7. A system for use in rules-based routing of a request, based on a proxy included in the request, the system comprising:

a first computing device including a first local directory including a plurality of local proxies, the first computing device further including executable instructions stored in a non-transitory computer readable storage media, which when executed by a processor of the first computing device, cause the processor to:

receive a lookup request to look up account data associated with a proxy from a requestor, the lookup request including the proxy, the proxy including a phone number;

determine a type of the proxy;

based on the type of the proxy, the proxy, and the one or more rules indicative of a scheme associated with the type of the proxy, determine that the proxy is non-local to the first local directory;

based on the determination that the proxy is non-local to the first local directory, and based on the one or more rules, submit the lookup request to a second computing device, in lieu of searching for the proxy among the local proxies in the first local directory;

receive, from the second computing device, a lookup response, which includes the account data linked to the proxy; and return the lookup response, to the requestor, in response to the lookup request.

8. The system of claim 7, wherein the executable instructions, when executed by the processor of the first computing device, further cause the processor to:

apply the one or more rules, which are consistent with the type of the proxy, to identify the scheme associated with the type of the proxy.

9. The system of claim 8, wherein applying the one or more rules includes applying one of the one or more rules, which defines the proxy as local or non-local; or wherein applying the one or more rules includes applying one of the one or more rules, which defines the scheme associated with the proxy; or wherein applying the one or more rules includes applying one of the one or more rules, which excludes schemes known not to be associated with the proxy.

10. The system of claim 7, wherein the first computing device is a participant computing device; and wherein the second computing device is a proxy service core computing device.

11. The system of claim 7, wherein the first computing device is a first proxy service core computing device; and wherein the second computing device is a second proxy service core computing device located in a region associated with the scheme.

12. The system of claim 7, wherein the scheme is defined by a region; and wherein the scheme is geographically based and defined as a country.

13. A non-transitory computer-readable storage medium comprising executable instructions, which when executed by at least one processor of a first computing device, cause the at least one processor to:

receive a proxy lookup request to look up account data associated with a proxy from a proxy requestor, the proxy lookup request including a proxy, the proxy including a phone number;

determine a type of the proxy;

based on the type of the proxy, the proxy, and the one or more rules indicative of a scheme associated with the type of the proxy, determine that the proxy is non-local to a first local directory of the first computing device;

based on the determination that the proxy is non-local to the first local directory, and based on the one or more rules, submit the proxy lookup request to a second computing device, in lieu of searching for the proxy in a local directory of the first computing device, which includes a plurality of local proxies;

receive, from the second computing device, a proxy lookup response, which includes account data linked to the proxy; and return the proxy lookup response, to the proxy requestor, in response to the proxy lookup request.

* * * * *